United States Patent
Liu et al.

(10) Patent No.: US 11,721,865 B2
(45) Date of Patent: Aug. 8, 2023

(54) BATTERY (71) Applicant: NINGDE AMPEREX TECHNOLOGY LIMITED, Ningde (CN)

(72) Inventors: Bin Liu, Ningde (CN); Peipei Guo, Ningde (CN); Fang Liu, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 408 days.

(21) Appl. No.: 16/649,810

(22) PCT Filed: Mar. 12, 2020

(86) PCT No.: PCT/CN2020/079036
§ 371 (c)(1),
(2) Date: Mar. 23, 2020

(87) PCT Pub. No.: WO2021/031553
PCT Pub. Date: Feb. 25, 2021

(65) Prior Publication Data
US 2021/0408628 A1   Dec. 30, 2021

(30) Foreign Application Priority Data
Aug. 16, 2019   (CN) .......................... 201910757456.5

(51) Int. Cl.
*H01M 50/559* (2021.01)
*H01M 10/052* (2010.01)
(Continued)

(52) U.S. Cl.
CPC ....... *H01M 50/202* (2021.01); *H01M 10/052* (2013.01); *H01M 50/107* (2021.01);
(Continued)

(58) Field of Classification Search
CPC .......... H01M 50/107; H01M 2220/30; H01M 50/202; H01M 10/052; H01M 50/247; H01M 50/559
(Continued)

(56) References Cited

U.S. PATENT DOCUMENTS

| 6,040,085 | A | * | 3/2000 | Cheu | ................. | H01M 10/0413 |
| | | | | | | 429/185 |
| 6,242,130 | B1 | | 6/2001 | Noh et al. | | |

(Continued)

FOREIGN PATENT DOCUMENTS

| CN | 102593406 A | 7/2012 |
| CN | 105098222 A | 11/2015 |

(Continued)

OTHER PUBLICATIONS

Chinese First Office Action dated Aug. 14, 2020 in counterpart Chinese application 201910757456.5, 8 pages in Chinese.
(Continued)

*Primary Examiner* — Jonathan G Jelsma
*Assistant Examiner* — Omar M Kekia
(74) *Attorney, Agent, or Firm* — Juan Carlos A. Marquez; Marquez IP Law Office, PLLC (57) ABSTRACT

A battery includes: a curved cell, having a first and second surfaces; a tab unit, connected to the cell and comprises a curved portion and a flat portion, the cell is curved along a direction perpendicular to an extending direction of the tab unit; and a package, including: a receiving portion and a flat encapsulating edge, the cell and the curved portion are received in the receiving portion, the receiving portion comprises a first receiving unit and a second receiving unit, radians of the first receiving unit and the second receiving unit are respectively matched with radian of the first surface and the second surface, and the flat portion is sealingly
(Continued)

attached to the edge and penetrates outward from the edge. The battery provided by the embodiments of the present application has good cell reliability, and can realize the sealing attachment of the tab unit to the edge.

20 Claims, 6 Drawing Sheets (51) Int. Cl.
  *H01M 50/247* (2021.01)
  *H01M 50/202* (2021.01)
  *H01M 50/107* (2021.01)
(52) U.S. Cl.
  CPC ....... *H01M 50/247* (2021.01); *H01M 50/559* (2021.01); *H01M 2220/30* (2013.01)
(58) Field of Classification Search
  USPC .......................................................... 429/185
  See application file for complete search history.

(56) References Cited

U.S. PATENT DOCUMENTS

| | | | | |
|---|---|---|---|---|
| 2014/0356692 | A1* | 12/2014 | Park | H01M 50/116 |
| | | | | 429/185 |
| 2016/0043355 | A1* | 2/2016 | Byun | H01M 10/052 |
| | | | | 29/623.2 |
| 2016/0141711 | A1 | 5/2016 | Jung | |
| 2016/0380302 | A1* | 12/2016 | Yun | H01M 10/0587 |
| | | | | 29/623.5 |
| 2017/0149029 | A1 | 5/2017 | Chang et al. | |

FOREIGN PATENT DOCUMENTS

| | | |
|---|---|---|
| CN | 105374978 A | 3/2016 |
| CN | 106299442 A | 3/2016 |
| CN | 105609863 A | 5/2016 |
| CN | 108428813 A | 8/2018 |
| CN | 109155386 A | 1/2019 |
| CN | 109411643 A | 3/2019 |
| CN | 109873109 A | 6/2019 |
| CN | 110416444 A | 11/2019 |
| JP | 2001057203 A | 2/2001 |

OTHER PUBLICATIONS

Chinese Notification of Grant of Patent Right and Supplementary Search Report dated Dec. 7, 2020 in counterpart Chinese application 201910757456.5, 5 pages in Chinese.

PCT International Search Report, dated Jun. 10, 2020 in counterpart PCT application PCT/CN2020/079036, 5 pages in Chinese.

* cited by examiner

BATTERY

BACKGROUND

1. Technical Field

Embodiments of the present application relate to the field of batteries, and more particularly to a curved battery.

2. Background

Secondary lithium batteries have been widely used in various electronic devices, and the demand for lithium batteries of various shapes is also increasing. For example, curved batteries have been used in a variety of devices such as human smart wearable devices, medical devices, mobile devices, and streamlined drones designed to reduce wind resistance. Accordingly, for a curved battery with an arc structure, a battery packaging bag with an arc structure is required to package the curved battery.

Therefore, regarding how to obtain a well-packaged curved battery by a simple and efficient process, there are still many technical problems to be solved in the industry.

SUMMARY

One of the objectives of the embodiments of the present application is to provide a battery that may be packaged conveniently and efficiently and has good cell reliability.

A battery according to one embodiment of the present application includes: a curved cell, having a first surface and a second surface opposite to the first surface; a tab unit, connected to the cell including a curved portion and a flat portion; and a package, including: a receiving portion including a first receiving unit and a second receiving unit opposite to the first receiving unit and a flat encapsulating edge surrounding the receiving portion; wherein the cell is curved along a direction perpendicular to an extending direction of the tab unit; the cell and the curved portion are received in the receiving portion. A radians of the first receiving unit and a radians of the second receiving unit are respectively matched with a radian of the first surface of the cell and a radian of the second surface of the cell, and the flat portion of the tab unit is sealingly attached to the flat encapsulating edge of the package and penetrates outward from the flat encapsulating edge.

In some embodiments of the present application, the first receiving unit has a first depth that varies depending on its position in a height direction of the battery, the second receiving unit has a second depth at the position corresponding to the first depth, a sum of the first depth and the corresponding second depth is equal to a thickness of the cell, wherein dimensions of the first receiving unit and the second receiving unit in their length direction, width direction and height direction are respectively greater than dimensions of the cell in its length direction, width direction and height direction.

In some embodiments of the present application, the flat encapsulating edge includes a first seal edge along a width direction of the battery, a second seal edge sealingly attached to the first seal edge, a third seal edge intersecting the first seal edge along a length direction of the battery, and a fourth seal edge sealingly attached to the third seal edge, wherein the flat portion of the tab unit is sealingly attached between the first seal edge and the second seal edge and penetrates outward from between the first seal edge and the second seal edge.

In some embodiments of the present application, each of the first seal edge and the second seal edge has a width of about 0.8 mm to 3 mm.

In some embodiments of the present application, each of the third seal edge and the fourth seal edge has a width of about 4 mm to 6 mm.

In some embodiments of the present application, the flat encapsulating edge is located in a plane between the first surface and the second surface.

In some embodiments of the present application, the first receiving unit and the second receiving unit are integrally formed.

In some embodiments of the present application, the first receiving unit and the second receiving unit are separated.

In some embodiments of the present application, the cell includes a first electrode plate, a second electrode plate and an isolation film located between the first electrode plate and the second electrode plate, the first electrode plate is provided with a first tab, and the second electrode plate is provided with a second tab.

In some embodiments of the present application, the flat encapsulating edge includes a first seal edge along a width direction of the battery, a second seal edge sealingly attached to the first seal edge, a third seal edge parallel to the first seal edge along the width direction of the battery, and a fourth seal edge sealingly attached to the third seal edge, wherein the flat portion of the tab unit is sealingly attached between the first seal edge and the second seal edge and penetrates outward from between the first seal edge and the second seal edge.

In some embodiments of the present application, each of the first seal edge, the second seal edge, the third seal edge and the fourth seal edge has a width of about 0.8 mm to 3 mm.

In some embodiments of the present application, the flat encapsulating edge includes a first seal edge along a width direction of the battery, a second seal edge sealingly attached to the first seal edge, a third seal edge parallel to the first seal edge along the width direction of the battery, a fourth seal edge sealingly attached to the third seal edge, a fifth seal edge intersecting the first seal edge and the third seal edge along a length direction of the battery, and a sixth seal edge sealingly attached to the fifth seal edge, a portion of the flat portion of the tab unit is sealingly attached between the first seal edge and the second seal edge and penetrates outward from between the first seal edge and the second seal edge, and a portion of the flat portion of the tab unit is sealingly attached between the third seal edge and the fourth seal edge and penetrates outward from between the third seal edge and the fourth seal edge.

In some embodiments of the present application, each of the first seal edge, the second seal edge, the third seal edge and the fourth seal edge has a width of about 0.8 mm to 3 mm.

In some embodiments of the present application, each of the fifth seal edge and the sixth seal edge has a width of about 4 mm to 6 mm.

In some embodiments of the present application, the package further includes a first portion connected to the first receiving unit and the first seal edge, and a second portion connected to the second receiving unit and the second seal edge.

In some embodiments of the present application, the first portion and the second portion are air bags, a dimension of the first portion in the width direction of the battery and a dimension of the second portion in the width direction of the battery are substantially equal.

In some embodiments of the present application, the package further includes a first portion connected to the first receiving unit, the first seal edge and the third seal edge, and a second portion connected to the second receiving unit, the second seal edge and the fourth seal edge.

In some embodiments of the present application, the first portion and the second portion are air bags, a dimension of the first portion in the width direction of the battery and a dimension of the second portion in the width direction of the battery are substantially equal.

In some embodiments of the present application, the package further includes a first portion connected to the first receiving unit, the first seal edge and the third seal edge, and a second portion connected to the second receiving unit.

In some embodiments of the present application, the first portion and the second portion are air bags, a dimension of the first portion in the width direction of the battery and a dimension of the second portion in the width direction of the battery are substantially equal.

According to the battery provided by the embodiments of the present application, the tab unit of the battery may be sealingly attached to the flat encapsulating edge of the package, and it is not necessary to manufacture the encapsulation edge of the package to be in arc shape, thereby realizing the simple and efficient packaging of the curved battery. Moreover, the battery provided by the embodiments of the present application also has good cell reliability.

BRIEF DESCRIPTION OF THE DRAWINGS

The accompanying drawings required by description about the embodiments of the present application or the prior art will be briefly described below to describe the embodiments of the present application. It is apparent that the accompanying drawings described below are only part of embodiments in the present application. For those skilled in the art, the accompanying drawings of other embodiments can still be obtained according to the structures illustrated in the accompanying drawings without any creative effort.

FIG. 1b shows a schematic diagram at the time of forming the cell shown in FIG. 1a.

FIG. 2b shows a rear schematic diagram of the package shown in FIG. 2a.

FIG. 3a shows a schematic diagram when the cell shown in FIG. 1a is ready to be placed in the package shown in FIG. 2a.

FIG. 3b shows a schematic diagram when the package shown in FIG. 2a is curved after the cell shown in FIG. 1a is placed in the package shown in FIG. 2a.

FIG. 3c shows a schematic diagram of a battery obtained after the cell shown in FIG. 1a is placed in the package shown in FIG. 2a.

DETAILED DESCRIPTION

Embodiments of this application are described below in detail. Throughout the entire specification of this application, the same or similar components or components having the same or similar functions are represented by using similar reference numerals. The embodiments related to the accompanying drawings that are described herein are illustrative and schematic, and are used to provide basic understanding for this application. The embodiments of this application should not be construed as limitations to this application.

In this specification, unless otherwise particularly indicated or limited, relativistic wordings such as "central", "longitudinal", "lateral", "front", "back", "right", "left", "inner", "outer", "relatively low", "relatively high", "horizontal", "vertical", "higher than", "lower than", "above", "below", "top", "bottom", and derived wordings thereof (such as "horizontally", "downward", and "upward") should be construed as referenced directions described in discussion or shown in the accompanying drawings. These relativistic wordings are merely for ease of description, and require constructing or operating this application in a particular direction.

As used in this application, terms "about", "roughly", "substantially", "essentially", and "approximately" are used for describing and explaining a small variation. When being used in combination with an event or a case, the terms may refer to an example in which the event or case exactly occurs, or an example in which the event or case similarly occurs. For example, when being used in combination with a value, the terms may refer to a variation range being less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if a difference between two values is less than or equal to ±10% of an average value of the values (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), it could be considered that the two values are "substantially" the same or "approximate".

Furthermore, in order to facilitate description, "first", "second", "third" and the like may be used herein for distinguishing different components of one figure or a series of figures. "First", "second", "third" and the like are not intended to describe corresponding components.

In the present application, otherwise specifically assigned or limited, "dispose", "connect", "couple", "fix" and words similar to them are wide in use, and those skilled in the art may understand the above words according to specific conditions, such as, fixed connection, detachable connection or integrated connection; it may also be mechanical connection or electrical connection; it may also be direct connection or indirect connection through an intermediary structure; and it may also be inner communication of two components.

In order to adapt to the arc shape of a curved cell, a packaging bag with an arc structure may be manufactured to receive the curved cell, wherein a sealing surface of the packaging bag also needs to be manufactured into a corresponding arc shape to adapt to a tab in an arc shape. However, in an actual manufacturing process, it is not easy to shape the sealing surface of the packaging bag to adapt to the arc shape of the tab. Such a forming process has low production efficiency and low product yield.

In view of the above, the present application designs a special structure of the tab unit so that the tab unit can be hermetically attached to the flat sealing surface of the packaging bag, thereby obtaining a curved battery in a convenient packaging process.

Figure 1A:
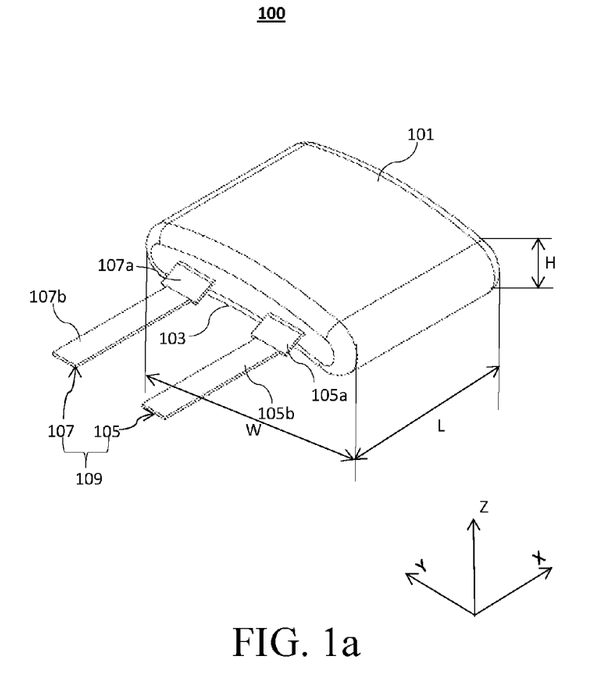
FIG. 1a shows a structural schematic diagram of a cell according to an embodiment of the present application.

FIG. 1a shows a structural schematic diagram of a cell 100 according to an embodiment of the present application. As shown in FIG. 1a, the cell 100 according to an embodiment of the present application includes: a first surface 101 and a second surface 103 opposite to the first surface 101. Each of the first surface 101 and the second surface 103 is a curved surface having a radian.

The cell 100 has a length direction X, a width direction Y perpendicular to the length direction X, and a thickness direction Z perpendicular to a plane where the length direction X and the width direction Y are located. The cell 100 has a length L along the length direction X, a width W along the width direction Y, and a thickness H along the thickness direction Z. The cell 100 is formed by winding a first electrode plate (not shown in the figures) and a second electrode plate (not shown in the figures). An isolation film (not shown in the figures) is provided between the first electrode plate and the second electrode plate. The first electrode plate is provided with a first tab 105, and the second electrode plate is provided with a second tab 107. The first tab 105 includes a curved portion 105a and a flat portion 105b. The second tab 107 includes a curved portion 107a and a flat portion 107b. The first tab 105 and the second tab 107 together form a tab unit 109 connected to the cell 100.

The cell 100 is curved along a direction perpendicular to an extending direction of the tab unit 109. That is, the cell 100 is curved along the width direction Y. Curving the cell 100 along the width direction Y has more significant advantages than curving the cell 100 along the length direction X. Since the cell 100 is formed by winding the electrode plates along the width direction Y, the plurality of electrode plates of the cell 100 are structurally looser in the width direction Y and provides larger flexibility. Curving the cell 100 along the longitudinal direction X needs to curve a plurality of electrode plates in the longitudinal direction X, which requires strong force because the curving direction is different from the winding direction of the electrode plates. Such a curving manner easily causes damage to the electrode plates, and thus decreases the reliability of the cell. In addition, if the tensile strength is greater than the ductility of the electrode plates, the electrode plates tend to break. In order to improve the reliability of the cell, in the embodiment of the present application, the cell 100 is curved along a winding direction of the electrode plates. That is, the curving direction is in a direction perpendicular to the extending direction of the tab unit 109. Such a curving manner in the embodiment may not only reduce or even avoid the breakage of the electrode plates, but also improves the reliability of the cell 100.

In order to match the curved cell 100, a receiving portion of the package that encapsulates the cell is also generally manufactured to be in a curved shape, and the packaging edge of the package is also manufactured to be curved. However, forming process of the packaging edge of the curved package is very complicated and has lower reliability. In this application, an arc-shaped package of which the encapsulation edge is horizontal and a receiving portion matches the curved cell is used to facilitate battery cell packaging.

However, curving the cell 100 along the width direction Y shown in FIG. 1a will cause the first tab 105 and the second tab 107 on the cell 100 to be curved accordingly. This makes the first tab 105 and the second tab 107 incapable of being sealingly attached to the flat encapsulating edge of the package of the cell 100.

Figure 1B:
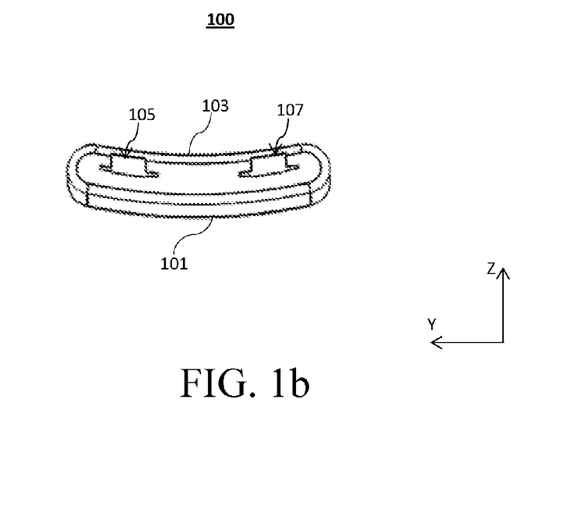

FIG. 1b shows a schematic diagram at the time of forming the cell 100 shown in FIG. 1a. As shown in FIG. 1b, after the cell 100 is curved along the width direction Y shown in FIG. 1a, the first tab 105 and the second tab 107 are also curved accordingly to exhibit an arc shape.

By adopting a curving process according to the embodiment of the present application, the first tab 105 and the second tab 107 are curved so that the first tab 105 includes a curved portion 105a and a flat portion 105b as shown in FIG. 1a, and the second tab 107 includes a curved portion 107a and a flat portion 107b as shown in FIG. 1a. Therefore, the flat portion 105b of the first tab 105 and the flat portion 107b of the second tab 107 may be sealingly attached to the horizontal encapsulation edge of the package of the cell 100, thereby meeting the requirements for the sealing attachment of the horizontal encapsulation edge of the package of the cell 100.

Therefore, the cell 100 provided by the embodiment of the present application may realize the sealing attachment of the tab unit 109 of the cell 100 to the flat encapsulating edge of the package while having good cell reliability, and avoids the process of manufacturing the horizontal encapsulation edge of the package into an arc, thereby realizing convenient and efficient packaging of the curved battery.

Figure 2A:
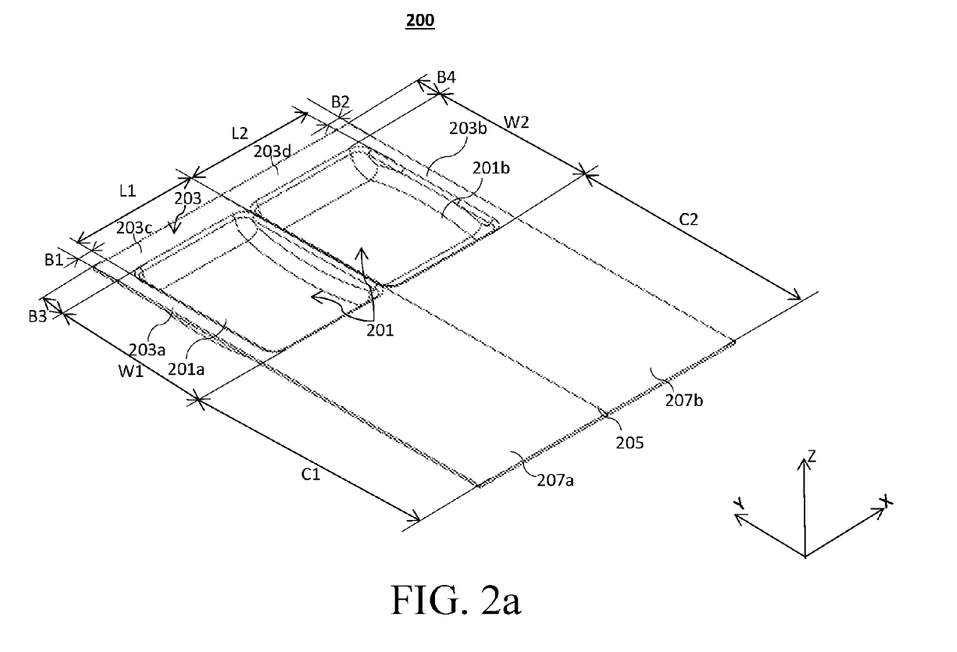
FIG. 2a shows a front schematic diagram of a package according to an embodiment of the present application.
Figure 2B:
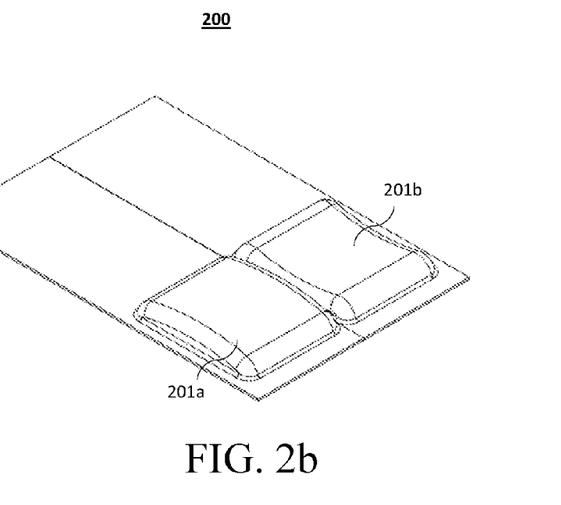

FIG. 2a shows a front schematic diagram of a package 200 according to an embodiment of the present application. FIG. 2b shows a rear schematic diagram of the package 200 shown in FIG. 2a. As shown in FIG. 2a and FIG. 2b, the package 200 includes a receiving portion 201 and a flat encapsulating edge 203 surrounding the receiving portion 201.

The material of the package 200 is a material of a packaging bag of a cell commonly used in the field, such as polypropylene, polyphthalamide, polyamide, or the like.

The receiving portion 201 includes a first receiving unit 201a and a second receiving unit 201b opposite to the first receiving unit 201a. The radians of the first receiving unit 201a and the radians of the second receiving unit 201b are respectively matched with the radian of the first surface 101 of the cell 100 and the radian of the second surface 103 of the cell 100. The first receiving unit 201a has a first depth that varies depending on its position in the thickness direction Z of the cell 100, the second receiving unit 201b has a second depth at the position corresponding to the first depth, and the sum of the first depth and the corresponding second depth is equal to the thickness H of the cell 100. The first receiving unit 201a and the second receiving unit 201b respectively have widths W1 and W2 in the width direction Y, and W1=W2. The first receiving unit 201a and the second receiving unit 201b respectively have lengths L1 and L2 in the length direction X, and L1=L2. The first receiving unit 201a and the second receiving unit 201b respectively have thicknesses in the thickness direction Z. The dimensions of the first receiving unit 201a and the dimensions of the second receiving unit 201b in the length direction X, the width direction Y and the thickness direction Z are respectively greater than dimensions of the cell 100 in the length direction X, the width direction Y and the thickness direction Z. The length L1 of the first receiving unit 201a and the length L2 of the second receiving unit 201b are respectively greater than the length L of the cell 100 by about 0.6 mm. The width W1 of the first receiving unit 201a and the width W2 of the second receiving unit 201b are respectively greater than the width W of the cell 100 by about 0.6 mm. In other embodiments of the present application, the length L1 of the first receiving unit 201a and the length L2 of the second receiving unit 201b are respectively greater than the length L of the cell 100 by any suitable dimension. The width W1 of the first receiving unit 201a and the width W2 of the second receiving unit 201b are respectively greater than the width W of the cell 100 by any suitable dimension. The first receiving unit 201a and the second receiving unit 201b are integrally formed. In other embodiments of the present application, the first receiving unit 201a and the second receiving unit 201b are separated.

The flat encapsulating edge 203 includes a first seal edge 203a along the width direction Y, a second seal edge 203b sealingly attached to the first seal edge 203a, a third seal edge 203c intersecting the first seal 203a along the length direction X, and a fourth seal edge 203d sealingly attached to the third seal edge 203c. The first receiving unit 201a and/or the second receiving unit 201b may be folded along a fold line 205, such that by a thermocompression bonding sealing process, the first seal edge 203a is sealingly attached to the second seal edge 203b, and the third seal edge 203c is sealingly attached to the fourth seal edge 203d. The first seal edge 203a has a width B1, the second seal edge 203b has a width B2, and B1=B2=about 0.8 mm. The third seal edge 203c has a width B3, the fourth seal edge 203d has a width B4, and B3=B4=about 4 mm. In other embodiments of the present application, the first seal edge 203a and the second seal edge 203b have a width dimension ranging from about 0.8 mm to about 3 mm, and the third seal edge 203c and the fourth seal edge 203d have a width dimension ranging from about 4 mm to about 6 mm.

The package 200 further includes a first portion 207a connected to the first receiving unit 201a and the first seal edge 203a, and a second portion 207b connected to the second receiving unit 201b and the second seal edge 203b. The first portion 207a and the second portion 207b may be air bags. The dimension C1 of the first portion 207a in the width direction Y and the dimension C2 of the second portion 207b in the width direction Y are substantially equal, and the values of the dimension C1 and the dimension C2 are set according to the amount of exhaust of the cell 100. The first receiving unit 201a and/or the second receiving unit 201b may be folded along the fold line 205, and by a thermocompression bonding sealing process, the first portion 207a is sealingly attached to the second portion 207b. Further, after the thermocompression bonding sealing of the first portion 207a and the second portion 207b, at least a portion of the first portion 207a and at least a portion of the second portion 207b may be cut away, such that the dimension C1 of the remaining first portion 207a in the width direction Y and the dimension C2 of the remaining second portion 207b in the width direction Y are substantially equal, and the dimension C1 and the dimension C2 range from about 0.8 mm to about 6 mm. In other embodiments of the present application, the first portion 207a and the second portion 207b may be flat encapsulating edges, the dimension C1 of the first portion 207a in the width direction Y and the dimension C2 of the second portion 207b in the width direction Y are substantially equal, and the dimension C1 and the dimension C2 range from about 0.8 mm to about 6 mm.

Figure 3A:
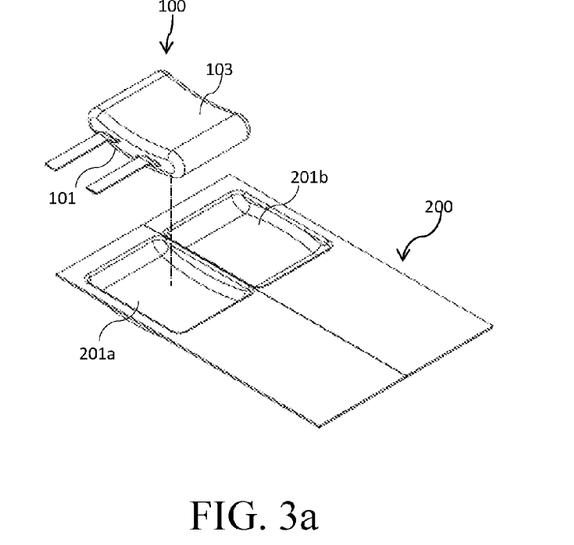
Figure 3B:
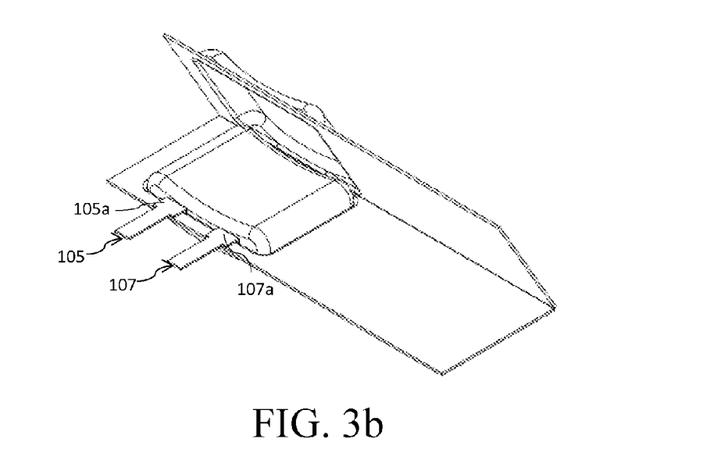
Figure 3C:
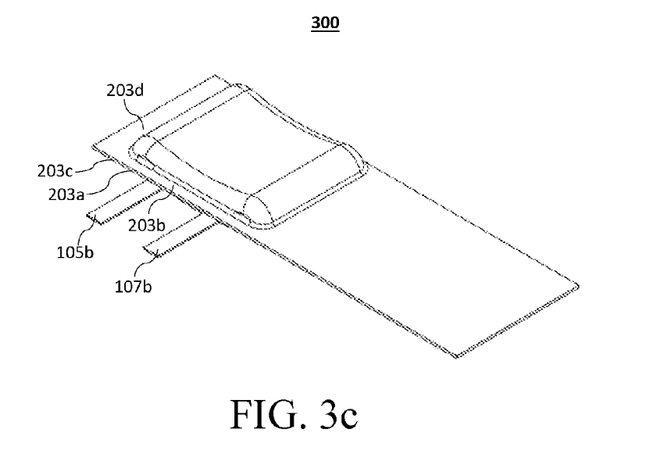

FIG. 3a shows a schematic diagram when the cell 100 shown in FIG. 1a is ready to be placed in the package 200 shown in FIG. 2a. FIG. 3b shows a schematic diagram when the package shown in FIG. 2a is curved after the cell 100 shown in FIG. 1a is placed in the package 200 shown in FIG. 2a. FIG. 3c shows a schematic diagram of a battery 300 obtained after the cell 100 shown in FIG. 1a is placed in the package 200 shown in FIG. 2a.

As shown in FIG. 3a, the cell 100 is placed in the first receiving unit 201a of the receiving portion 201 of the package 200, and the radian of the first surface 101 of the cell 100 is matched with that of the first receiving unit 201a of the receiving portion 201 of the package 200.

As shown in FIG. 3b, the second receiving unit 201b is folded along the fold line 205.

As shown in FIG. 3c, by a thermocompression bonding sealing process, the first seal edge 203a of the package 200 is sealingly attached to the second seal edge 203b of the package 200, the third seal edge 203c of the package 200 is sealingly attached to the fourth seal edge 203d of the package 200, and the first portion 207a and the second portion 207b are sealingly attached to obtain the packaged battery 300. The flat portions 105b and 107b of the tab unit 109 are sealingly attached between the first seal edge 203a and the second seal edge 203b, and penetrate outward from between the first seal edge 203a and the second seal edge 203b. The cell 100 and the curved portions 105a and 107a of the tab unit 109 are received in the receiving portion 201. The flat encapsulating edge 203 is located in a plane between the first surface 101 and the second surface 103 of the cell 100. The first surface 101 of the cell 100 is substantially completely fitted with the first receiving unit 201a of the receiving portion 201 of the package 200. The second surface 103 of the cell 100 is substantially completely fitted with the second receiving unit 201b of the receiving portion 201 of the package 200.

Next, after the battery 300 as shown in FIG. 3c is obtained, at least a portion of the first portion 207a as one air bag and at least a portion of the second portion 207b as one air bag may be cut away, such that the dimension C1 of the remaining first portion 207a along the width direction Y and the dimension C2 of the remaining second portion 207b along the width direction Y are substantially equal, and the dimension C1 and the dimension C2 range from about 0.8 mm to about 6 mm.

Since the cell 100 of the battery 300 provided by the embodiment of the present application is curved along a direction perpendicular to the extending direction of the tab unit 109, it has better cell reliability. Moreover, the tab unit 109 of the cell 100 may be sealingly attached to the flat encapsulating edge of the package 200, and it is not necessary to manufacture the encapsulation edge of the package 200 to be in arc shape, thereby realizing the simple and efficient packaging of the curved battery. Therefore, the battery 300 provided by the embodiment of the present application has many advantages such as high cell reliability, simple packaging process, high productivity and the like.

Figure 4:
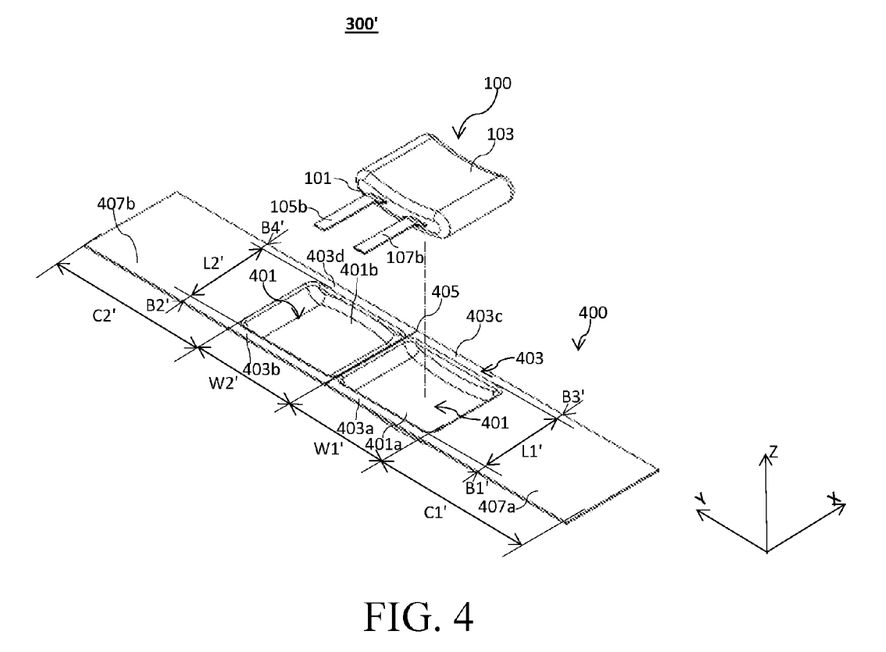
FIG. 4 shows a schematic diagram when the cell shown in FIG. 1a is ready to be placed in a package according to another embodiment of the present application to obtain a battery according to another embodiment of the present application.

FIG. 4 shows a schematic diagram when the cell 100 shown in FIG. 1a is ready to be placed in a package 400 according to another embodiment of the present application to obtain a battery 300' according to another embodiment of the present application. The battery 300' includes the package 400 and the cell 100.

The material of the package 400 is a material of a packaging bag of a cell commonly used in the field, such as polypropylene, polyphthalamide, polyamide, or the like.

The package 400 includes a receiving portion 401 and a flat encapsulating edge 403 surrounding the receiving portion 401.

The receiving portion 401 includes a first receiving unit 401a and a second receiving unit 401b opposite to the first receiving unit 401a. The radians of the first receiving unit 401a and the radians of the second receiving unit 401b are respectively matched with the radian of the first surface 101 of the cell 100 and the radian of the second surface 103 of the cell 100. The first receiving unit 401a has a first depth that varies depending on its position in the thickness direction Z of the cell 100. The second receiving unit 401b has a second depth at the position corresponding to the first depth. The sum of the first depth and the corresponding second depth is equal to the thickness H of the cell 100. The first receiving unit 401a and the second receiving unit 401b respectively have widths W1' and W2' in the width direction Y, and WP=W2'. The first receiving unit 401a and the second receiving unit 401b respectively have lengths L1' and L2' in the length direction X, and L1'=L2'. The first receiving unit 401a and the second receiving unit 401b respectively have thicknesses in the thickness direction Z. The dimensions of the first receiving unit 401a and the dimensions of the second receiving unit 401b in the length direction X, the width direction Y and the thickness direction Z are respectively greater than dimensions of the cell 100 in the length direction X, the width direction Y and the thickness direction Z. The length L1' of the first receiving unit 401a and the length L2' of the second receiving unit 401b are respectively greater than the length L of the cell 100 by about 0.6 mm. The width W1' of the first receiving unit 401a and the width W2' of the second receiving unit 401b are respectively greater than the width W of the cell 100 by about 0.6 mm. In other embodiments of the present application, the length L1' of the first receiving unit 401a and the length L2' of the second receiving unit 401b are respectively greater than the length L of the cell 100 by any suitable dimension. The width W1' of the first receiving unit 401a and the width W2' of the second receiving unit 401b are respectively greater than the width W of the cell 100 by any suitable dimension. The first receiving unit 401a and the second receiving unit 401b are integrally formed. In other embodiments of the present application, the first receiving unit 401a and the second receiving unit 401b are separated.

The flat encapsulating edge 403 includes a first seal edge 403a along the width direction Y, a second seal edge 403b sealingly attached to the first seal edge 403a, a third seal edge 403c parallel to the first seal 403a along the width direction Y, and a fourth seal edge 403d sealingly attached to the third seal edge 403c. The first receiving unit 401a and/or the second receiving unit 401b may be folded along a fold line 405, such that by a thermocompression bonding sealing process, the first seal edge 403a is sealingly attached to the second seal edge 403b, and the third seal edge 403c is sealingly attached to the fourth seal edge 403d. The first seal edge 403a has a width B1', the second seal edge 403b has a width B2', the third seal edge 403c has a width B3', the fourth seal edge 403d has a width B4', and B1'=B2'=B3'=B4'=about 0.8 mm. In other embodiments of the present application, the first seal edge 403a, the second seal edge 403b, the third seal edge 403c, and the fourth seal edge 403d have a width dimension ranging from about 0.8 mm to about 3 mm.

The package 400 further includes a first portion 407a connected to the first receiving unit 401a, the first seal edge 403a and the third seal edge 403c, and a second portion 407b connected to the second receiving unit 401b, the second seal edge 403b and the fourth seal edge 403d. The first portion 407a and the second portion 407b may be air bags. The dimension C1' of the first portion 407a along the width direction Y and the dimension C2' of the second portion 407b along the width direction Y are substantially equal, and the values of the dimension C1' and the dimension C2' are set according to the amount of exhaust of the cell 100. The first receiving unit 401a and/or the second receiving unit 401b may be folded along the fold line 405, such that by a thermocompression bonding sealing process, the first portion 407a is sealingly attached to the second portion 407b. Further, after the thermocompression bonding sealing of the first portion 407a and the second portion 407b, at least a portion of the first portion 407a and at least a portion of the second portion 407b may be cut away, such that the dimension C1' of the remaining first portion 407a along the width direction Y and the dimension C2' of the remaining second portion 407b in along the width direction Y are substantially equal, and the dimension C1' and the dimension C2' range from about 0.8 mm to about 6 mm. In other embodiments of the present application, the first portion 407a and the second portion 407b may be flat encapsulating edges, the dimension C1' of the first portion 407a along the width direction Y and the dimension C2' of the second portion 407b along the width direction Y are substantially equal, and the dimension C1' and the dimension C2' range from about 0.8 mm to about 6 mm.

By a thermocompression bonding sealing process, the first seal edge 403a of the package 400 is sealingly attached to the second seal edge 403b of the package 400, the third seal edge 403c of the package 400 is sealingly attached to the fourth seal edge 403d of the package 400, and the first portion 407a and the second portion 407b are sealingly attached to obtain the packaged battery 300'. The flat portions 105b and 107b of the tab unit 109 are sealingly attached between the first seal edge 403a and the second seal edge 403b and penetrate outward from between the first seal edge 403a and the second seal edge 403b, and the cell 100 and the curved portions 105a and 107a of the tab unit 109 are received in the receiving portion 401. The flat encapsulating edge 403 is located in a plane between the first surface 101 and the second surface 103 of the cell 100. The first surface 101 of the cell 100 is substantially completely fitted with the first receiving unit 401a of the receiving portion 401 of the package 400, and the first surface 103 of the cell 100 is substantially completely fitted with the second receiving unit 401b of the receiving portion 401 of the package 400.

At least a portion of the first portion 407a as one air bag and at least a portion of the second portion 407b as one air bag may be cut away, such that the dimension C1' of the remaining first portion 407a along the width direction Y and the dimension C2' of the remaining second portion 407b along the width direction Y are substantially equal, and the dimension C1' and the dimension C2' range from about 0.8 mm to about 6 mm.

Since the cell 100 of the battery 300' provided by the embodiment of the present application is curved along a direction perpendicular to the extending direction of the tab unit 109, it has better cell reliability. Moreover, the tab unit 109 of the cell 100 may be sealingly attached to the flat encapsulating edge of the package 400, and it is not necessary to manufacture the encapsulation edge of the package 400 to be in arc shape, thereby realizing the simple and efficient packaging of the curved battery. Therefore, the battery 300' provided by the embodiment of the present application has many advantages such as high cell reliability, simple packaging process, high productivity and the like.

Figure 5:
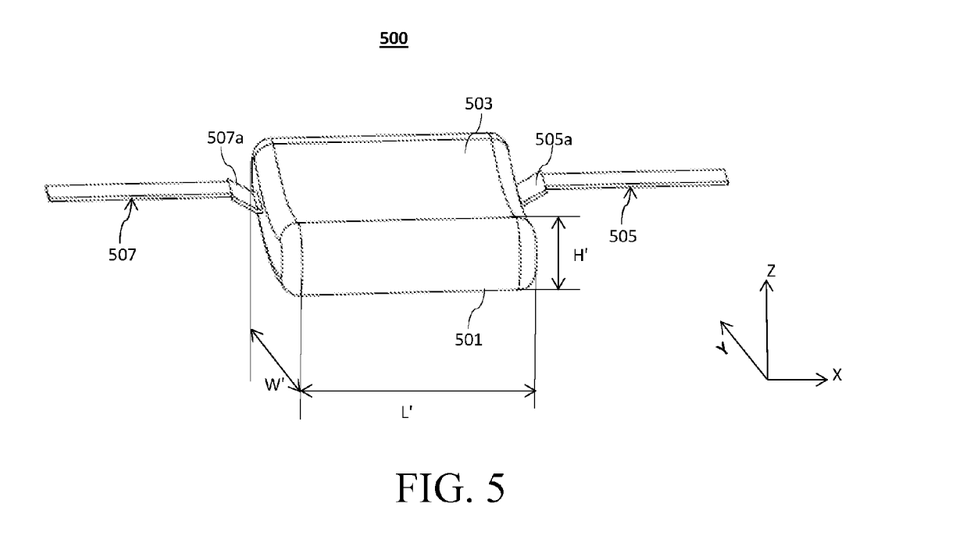
FIG. 5 shows a structural schematic diagram of a cell according to another embodiment of the present application.

FIG. 5 shows a structural schematic diagram of a cell 500 according to another embodiment of the present application. As shown in FIG. 5, the cell 500 shown in FIG. 5 is different from the cell 100 shown in FIG. 1 in that: a first tab 505 and a second tab 507 of the cell 500 are respectively located on two opposite sides.

Figure 6:
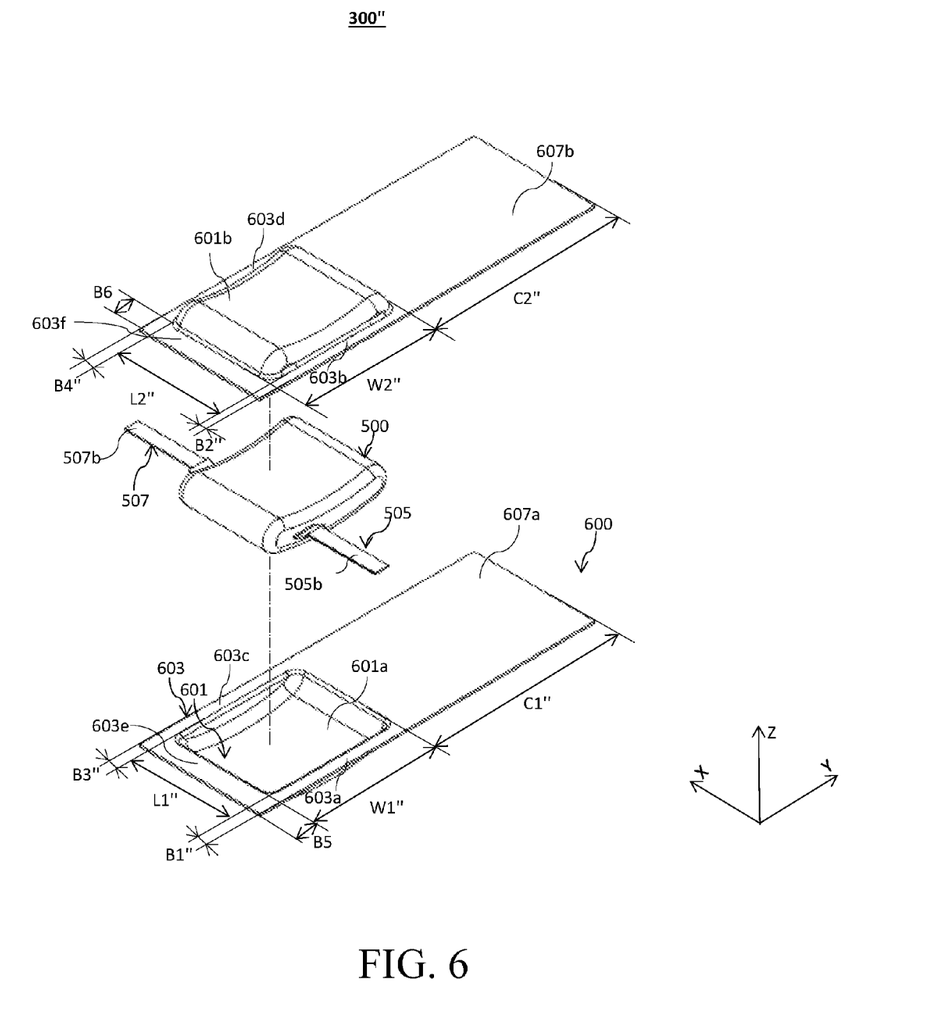
FIG. 6 shows a schematic diagram when the cell shown in FIG. 5 is ready to be placed in a package according to another embodiment of the present application to obtain a battery according to another embodiment of the present application.

FIG. 6 shows a schematic diagram when the cell 500 shown in FIG. 5 is ready to be placed in a package 600 according to another embodiment of the present application to obtain a battery 300" according to another embodiment of the present application. The battery 300" includes the package 600 and the cell 500.

The material of the package 600 is a material of a packaging bag of a cell commonly used in the field, such as polypropylene, polyphthalamide, polyamide, or the like.

The package 600 includes a receiving portion 601 and a flat encapsulating edge 603 surrounding the receiving portion 601.

The receiving portion 601 includes a first receiving unit 601a and a second receiving unit 601b opposite to the first receiving unit 601a. The radians of the first receiving unit 601a and the radians of the second receiving unit 601b are respectively matched with the radian of a first surface 501 of the cell 500 and the radian of a second surface 503 of the cell 500. The first receiving unit 601a has a first depth that varies depending on its position in the thickness direction Z of the cell 500, the second receiving unit 601b has a second depth at the position corresponding to the first depth. The sum of the first depth and the corresponding second depth is equal to the thickness H' of the cell 500. The first receiving unit 601a and the second receiving unit 601b respectively have lengths L1" and L2" in the length direction X, and L1"=L2". The first receiving unit 601a and the second receiving unit 601b respectively have widths W1" and W2" in the width direction Y, and W1"=W2". The first receiving unit 601a and the second receiving unit 601b respectively have thicknesses in the thickness direction Z. The dimensions of the first receiving unit 601a and the dimensions of the second receiving unit 601b in the length direction X, the width direction Y and the thickness direction Z are respectively greater than dimensions of the cell 500 in the length direction X, the width direction Y and the thickness direction Z. The length L1" of the first receiving unit 601a and the length L2" of the second receiving unit 601b are respectively greater than the length L' of the cell 500 by about 0.6 mm. The width W1" of the first receiving unit 601a and the width W2" of the second receiving unit 601b are respectively greater than the width W' of the cell 500 by about 0.6 mm. In other embodiments of the present application, the length L1" of the first receiving unit 601a and the length L2" of the second receiving unit 601b are respectively greater than the length L' of the cell 500 by any suitable dimension. The width W1' of the first receiving unit 601a and the width W2" of the second receiving unit 601b are respectively greater than the width W' of the cell 600 by any suitable dimension. The first receiving unit 601a and the second receiving unit 601b are separated. In other embodiments of the present application, the first receiving unit 601a and the second receiving unit 601b are integrally formed.

The flat encapsulating edge 603 includes a first seal edge 603a along the width direction Y, a second seal edge 603b sealingly attached to the first seal edge 603a, a third seal edge 603c parallel to the first seal edge 603a along the width direction Y, a fourth seal edge 603d sealingly attached to the third seal edge 603c, a fifth seal edge 603e intersecting the first seal edge 603a and the third seal edge 603c along the length direction X, and a sixth seal edge 603f sealingly attached to the fifth seal edge 603e. By a thermocompression bonding sealing process, the first seal edge 603a is sealingly attached to the second seal edge 603b, the third seal edge 603c is sealingly attached to the fourth seal edge 603d, and the fifth seal edge 603e is sealingly attached to the sixth seal edge 603f. The first seal edge 603a has a width B1", the second seal edge 603b has a width B2", the third seal edge 603c has a width B3", the fourth seal edge 603d has a width B4", and B1'=B2"=B3"=B4"=about 0.8 mm. The fifth seal edge 603e and the sixth seal edge 603f have widths B5 and B6, and B5=B6=about 4 mm. In other embodiments of the present application, the first seal edge 603a, the second seal edge 603b, the third seal edge 603c, and the fourth seal edge 603d have a width dimension ranging from about 0.8 mm to about 3 mm, and the fifth seal edge 603e and the sixth seal edge 603f have a width dimension ranging from about 4 mm to about 6 mm.

The package 600 further includes a first portion 607a connected to the first receiving unit 601a, the first seal edge 603a and the third seal edge 603c, and a second portion 607b connected to the second receiving unit 601b, the second seal edge 603b and the fourth seal edge 603d. The dimension C1" of the first portion 607a in the width direction Y and the dimension C2" of the second portion 607b in the width direction Y are substantially equal, and the values of the dimension C1" and the dimension C2" are set according to the amount of exhaust of the cell 500. By a thermocompression bonding sealing process, the first portion 607a may be sealingly attached to the second portion 607b. Further, after the thermocompression bonding sealing of the first portion 607a and the second portion 607b, at least a portion of the first portion 607a and at least a portion of the second portion 607b may be cut away, such that the dimension C1" of the remaining first portion 607a along the width direction Y and the dimension C2" of the remaining second portion 607b along the width direction Y are substantially equal, and the dimension C1" and the dimension C2" range from about 0.8 mm to about 6 mm. In other embodiments of the present application, the first portion 607a and the second portion 607b may be flat encapsulating edges, the dimension C1" of the first portion 607a along the width direction Y and the dimension C2" of the second portion 607b along the width direction Y are substantially equal, and the dimension C1" and the dimension C2" range from about 0.8 mm to about 6 mm.

By a thermocompression bonding sealing process, the first seal edge 603a of the package 600 is sealingly attached to the second seal edge 603b of the package 600, the third seal edge 603c of the package 600 is sealingly attached to the fourth seal edge 603d of the package 600, the fifth seal edge 603e of the package 600 is sealingly attached to the sixth seal edge 603f of the package 600, and the first portion 607a of the package 600 is sealingly attached to the second portion 607b of the package 600 to obtain the packaged battery 300". A flat portion 505b of a tab unit 509 composed of the first tab 505 and the second tab 507 is sealingly attached between the first seal edge 603a and the second seal edge 603b and penetrates outward from between the first seal edge 603a and the second seal edge 603b, and a flat portion 507b of the tab unit 509 composed of the first tab 505 and the second tab 507 is sealingly attached between the third seal edge 603c and the fourth seal edge 603d and penetrates outward from between the third seal edge 603c and the fourth seal edge 603d. The cell 500 and curved portions 505a and 507a of the tab unit 509 are received in the receiving portion 601. The flat encapsulating edge 603 is located in a plane between the first surface 501 and the second surface 503 of the cell 500, the first surface 501 of the cell 500 is substantially completely fitted with the first receiving unit 601a of the receiving portion 601 of the package 600, and the first surface 503 of the cell 500 is substantially completely fitted with the second receiving unit 601b of the receiving portion 601 of the package 600.

At least a portion of the first portion 607a as one air bag and at least a portion of the second portion 607b as one air bag may be further cut away, such that the dimension C1" of the remaining first portion 607a along the width direction Y and the dimension C2" of the remaining second portion 607b along the width direction Y are substantially equal, and the dimension C1" and the dimension C2" range from about 0.8 mm to about 6 mm.

Since the cell 500 of the battery 300" provided by the embodiment of the present application is curved along a direction perpendicular to the extending direction of the tab unit 509, it has better cell reliability. In addition, the tab unit 509 of the cell 500 may be sealingly attached to the flat encapsulating edge of the package 600, and it is not necessary to manufacture the encapsulation edge of the package 600 to be in arc shape, thereby realizing the simple and efficient packaging of the curved battery. Therefore, the battery 300" provided by the embodiment of the present application has many advantages such as high cell reliability, simple packaging process, high productivity and the like.

The technical content and technical features of this application are disclosed above. However, persons skilled in the art may still make replacements and modifications based on the teachings and the disclosure of this application without departing from the spirit of this application. Therefore, the protection scope of this application should not be limited to the content disclosed in the embodiments, and should include various replacements and modifications without departing from this application, and is covered by the claims of this patent.

What is claimed is:

1. A battery, comprising:
   a curved cell, having a first surface and a second surface opposite to the first surface;
   a tab unit, connected to the cell and comprising a curved portion and a flat portion; and
   a package, comprising:
      a receiving portion comprising a first receiving unit and a second receiving unit opposite to the first receiving unit; and
      a flat encapsulating edge surrounding the receiving portion;
   wherein the cell is curved along a direction perpendicular to an extending direction of the tab unit; the cell and the curved portion are received in the receiving portion; a radian of the first receiving unit and a radian of the second receiving unit are respectively matched with a radian of the first surface of the cell and a radian of the second surface of the cell; and the flat portion of the tab unit is sealingly attached to the flat encapsulating edge of the package and penetrates outward from the flat encapsulating edge, and wherein the curved portion of the tab unit is curved along the direction perpendicular to the extending direction of the tab unit.

2. The battery according to claim 1, wherein the first receiving unit has a first depth, the first depth varies depending on the position of the first receiving unit in a height direction of the battery; the second receiving unit has a second depth at the position corresponding to the first depth, a sum of the first depth and the corresponding second depth is equal to a thickness of the cell, wherein dimensions of the first receiving unit and the second receiving unit in a length direction, a width direction and a height direction are respectively greater than dimensions of the cell in the length direction, the width direction and the height direction.

3. The battery according to claim 1, wherein the flat encapsulating edge comprises a first seal edge along a width direction of the battery, a second seal edge sealingly attached to the first seal edge, a third seal edge intersecting the first seal edge along a length direction of the battery, and a fourth seal edge sealingly attached to the third seal edge, wherein the flat portion of the tab unit is sealingly attached between the first seal edge and the second seal edge and penetrates outward from between the first seal edge and the second seal edge.

4. The battery according to claim 3, wherein each of the first seal edge and the second seal edge has a width of 0.8 mm to 3 mm.

5. The battery according to claim 3, wherein each of the third seal edge and the fourth seal edge has a width of 4 mm to 6 mm.

6. The battery according to claim 3, wherein the package further comprises a first portion connected to the first receiving unit and the first seal edge, and a second portion connected to the second receiving unit and the second seal edge.

7. The battery according to claim 6, wherein the first portion and the second portion are air bags, a dimension of the first portion in the width direction of the battery and a dimension of the second portion in the width direction of the battery are substantially equal.

8. The battery according to claim 1, wherein the flat encapsulating edge is located in a plane between the first surface and the second surface.

9. The battery according to claim 1, wherein the first receiving unit and the second receiving unit are integrally formed.

10. The battery according to claim 1, wherein the first receiving unit and the second receiving unit are separated.

11. The battery according to claim 1, wherein the cell comprises a first electrode plate, a second electrode plate and an isolation film located between the first electrode plate and the second electrode plate, the first electrode plate is provided with a first tab, and the second electrode plate is provided with a second tab.

12. The battery according to claim 1, wherein the flat encapsulating edge comprises a first seal edge along a width direction of the battery, a second seal edge sealingly attached to the first seal edge, a third seal edge parallel to the first seal edge along the width direction of the battery, and a fourth seal edge sealingly attached to the third seal edge, wherein the flat portion of the tab unit is sealingly attached between the first seal edge and the second seal edge and penetrates outward from between the first seal edge and the second seal edge.

13. The battery according to claim 12, wherein each of the first seal edge, the second seal edge, the third seal edge, and the fourth seal edge has a width of 0.8 mm to 3 mm.

14. The battery according to claim 12, wherein the package further comprises a first portion connected to the first receiving unit, the first seal edge and the third seal edge, and a second portion connected to the second receiving unit, the second seal edge and the fourth seal edge.

15. The battery according to claim 14, wherein the first portion and the second portion are air bags, a dimension of the first portion in the width direction of the battery and a dimension of the second portion in the width direction of the battery are substantially equal.

16. The battery according to claim 1, wherein the flat encapsulating edge comprises a first seal edge along a width direction of the battery, a second seal edge sealingly attached to the first seal edge, a third seal edge parallel to the first seal edge along the width direction of the battery, a fourth seal edge sealingly attached to the third seal edge, a fifth seal edge intersecting the first seal edge and the third seal edge along a length direction of the battery, and a sixth seal edge sealingly attached to the fifth seal edge; a portion of the flat portion of the tab unit is sealingly attached between the first seal edge and the second seal edge and penetrates outward from between the first seal edge and the second seal edge; and a portion of the flat portion of the tab unit is sealingly attached between the third seal edge and the fourth seal edge and penetrates outward from between the third seal edge and the fourth seal edge.

17. The battery according to claim 16, wherein each of the first seal edge, the second seal edge, the third seal edge, and the fourth seal edge has a width of 0.8 mm to 3 mm.

18. The battery according to claim 16, wherein each of the fifth seal edge and the sixth seal edge has a width of 4 mm to 6 mm.

19. The battery according to claim 16, wherein the package further comprises a first portion connected to the first receiving unit, the first seal edge and the third seal edge, and a second portion connected to the second receiving unit.

20. The battery according to claim 19, wherein the first portion and the second portion are air bags, a dimension of the first portion in the width direction of the battery and a dimension of the second portion in the width direction of the battery are substantially equal.

\* \* \* \* \*